United States Patent
Meier (10) Patent No.: US 7,695,747 B2
(45) Date of Patent: Apr. 13, 2010

(54) METHOD OF PRODUCING DRIED DISTILLERS GRAIN AGGLOMERATED PARTICLES

(76) Inventor: Russell Meier, 961 Colony Dr., Davenport, IA (US) 52806

( * ) Notice: Subject to any disclaimer, the term of this patent is extended or adjusted under 35 U.S.C. 154(b) by 0 days.

(21) Appl. No.: 12/210,851

(22) Filed: Sep. 15, 2008

(65) Prior Publication Data

US 2009/0071066 A1 Mar. 19, 2009

Related U.S. Application Data

(60) Provisional application No. 60/994,035, filed on Sep. 17, 2007.

(51) Int. Cl.
*A23J 3/14* (2006.01)
(52) U.S. Cl. .............. 426/237; 426/31; 426/54; 426/285; 426/516; 426/624
(58) Field of Classification Search .............. 426/96, 426/237, 241, 242, 285, 31, 624, 53, 54; 203/19, 18; 435/161–163; 210/298; 100/903–909
See application file for complete search history.

(56) References Cited

U.S. PATENT DOCUMENTS

| | | | | |
|---|---|---|---|---|
| 2,663,667 | A * | 12/1953 | Lampson | 435/161 |
| 3,993,739 | A * | 11/1976 | Vanderveen | 423/449.2 |
| 4,055,001 | A | 10/1977 | Forster et al. | |
| 4,109,019 | A | 8/1978 | Moore | |
| 4,464,402 | A * | 8/1984 | Gannon | 426/242 |
| 4,552,775 | A * | 11/1985 | Baeling et al. | 426/624 |
| 5,106,634 | A | 4/1992 | Thacker et al. | |
| 5,182,127 | A | 1/1993 | Schwab et al. | |
| 5,902,615 | A | 5/1999 | Saniez et al. | |
| 5,958,233 | A * | 9/1999 | Willgohs | 210/259 |
| 6,274,178 | B1 | 8/2001 | Beven et al. | |
| 6,534,105 | B2 * | 3/2003 | Kartchner | 426/241 |
| 6,616,953 | B2 | 9/2003 | Fidler et al. | |
| 7,332,119 | B2 | 2/2008 | Riebel | |
| 2002/0046474 | A1 | 4/2002 | Novak et al. | |
| 2002/0150617 | A1 | 10/2002 | Mergens et al. | |
| 2003/0019736 | A1 * | 1/2003 | Garman | 203/23 |
| 2004/0185148 | A1 | 9/2004 | Said | |

(Continued)

FOREIGN PATENT DOCUMENTS

GB  1782697 A2  9/2007

*Primary Examiner*—Drew E Becker
*Assistant Examiner*—Steven Leff
(74) *Attorney, Agent, or Firm*—Hamilton IP Law, PC; Jay R. Hamilton; Charles A. Damschen (57) ABSTRACT

A method of producing Dried Distiller's Grain with Solubles (DDGS) agglomerated particles is disclosed. The method comprises the steps of separating a first product stream out of the whole stillage that is primarily solid material from a second product stream that is primarily liquid, agglomerating the first product stream using a mechanical compression machine such as an extruder, and exposing the agglomerated particles to microwave radiation of a sufficient energy for a sufficient time so that the resulting moisture of the agglomerated particles is between 3% and 40% by weight. The second product stream may be condensed and blended with the first product stream prior to, or concurrently with, the step in which the agglomerated particles are formed. Additionally, other additives, such as enzymes, may be added to the first product stream to enhance the final product's desirability as a nutritional source.

2 Claims, 8 Drawing Sheets

U.S. PATENT DOCUMENTS

| | | |
|---|---|---|
| 2004/0234649 A1 | 11/2004 | Lewis et al. |
| 2005/0101700 A1* | 5/2005 | Riebel .......................... 524/17 |
| 2005/0274035 A1* | 12/2005 | Beal et al. ...................... 34/63 |
| 2006/0251764 A1 | 11/2006 | Abbas et al. |
| 2007/0128334 A1 | 6/2007 | Pitman |
| 2007/0172540 A1 | 7/2007 | Neece et al. |
| 2008/0220125 A1 | 9/2008 | Abbas et al. |
| 2008/0260896 A1 | 10/2008 | Cecava et al. |

* cited by examiner

METHOD OF PRODUCING DRIED DISTILLERS GRAIN AGGLOMERATED PARTICLES

CROSS REFERENCE TO RELATED APPLICATIONS

This application claims the filing benefit under 35 U.S.C. §119(e) of provisional U.S. Patent Application Ser. No. 60/994,035 filed on Sep. 17, 2007, which is incorporated by reference herein.

FIELD OF INVENTION

The present invention relates to the processing of grain, and more particularly to the production of dried distiller's grain with solubles pellets and/or agglomerated particles as a co-product of ethanol production.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BACKGROUND

The Ethanol Production Process

Dry Milling

In dry milling, the entire corn kernel or other starchy grain is first ground into flour, which is referred to in the industry as "meal" and processed without separating the various component parts of the grain. The grinding is typically performed by a hammermill or other grinder to produce a medium-coarse to fine grind meal. The meal is mixed with water in known ratios to form a slurry referred to as "mash." The temperature and pH of the mash are adjusted and enzymes are added to the mash to convert the starch to dextrose, a simple sugar. After substantially all of the starch has been converted into dextrose or dextrin, the mash is heated to kill unwanted lactic acid producing bacteria. Ammonia is added for pH control and as a nutrient to the yeast. The mash is cooled and transferred to fermenters where yeast is added and the conversion of sugar to ethanol and carbon dioxide ($CO_2$) takes place. The fermentation process generally takes about 40 to 50 hours, and the $CO_2$ released during fermentation is captured and sold for use in carbonating soft drinks and beverages and the manufacture of dry ice. During this part of the process, the mash is agitated and kept cool to facilitate the activity of the yeast. The corn protein and recycled waters (stillage) provide a major source of nitrogen compounds absorbed by the yeast microbes. The fats and fiber in the fermenter remain untouched and concentrate as the starch is converted to ethanol.

After fermentation, the resulting "beer" is transferred to distillation columns where the ethanol is separated from the remaining "stillage" or "whole stillage." The ethanol is concentrated to 190 proof using conventional distillation and then is dehydrated to approximately 200 proof in a molecular sieve system. The anhydrous ethanol is then blended with about 5% denaturant (such as natural gasoline) to render it undrinkable and thus not subject to beverage alcohol tax. It is then ready for shipment to gasoline terminals or retailers.

The stillage may be sent through a centrifuge that separates the coarse grain from the solubles. The solubles may then be concentrated to about 30% solids by evaporation, resulting in Condensed Distillers Solubles (CDS) or "syrup." The coarse grain and the syrup are then blended and subsequently dried together to produce dried distillers grains with solubles (DDGS), a high quality, nutritious livestock feed. Typically, the coarse grain and CDS are dried using a rotary drum dryer to produce the final DDGS product. Because the rate of drying is proportional to the mass-to-surface-area ratio, the particle size is minimized prior to drying so that the material to be dried has a large amount of surface area relative to the material's mass. Small particle size is also beneficial for drying because to achieve the desired final moisture content, the interior of the particle must reach a certain temperature. If the particle is smaller, the interior of the particle may reach the necessary temperature in a shorter amount of time, which decreases the likelihood of charring or burning the exterior of the particle.

However, because of the properties of DDGS, the small particle size that is beneficial for drying leads to logistical problems. The small DDGS particles are difficult to transport because the small particles tend to adhere to one another or "cake" during transport. The cake formed by the small particles often becomes extremely rigid, which makes emptying the container of DDGS very onerous, as described below. Consequently, many ethanol producers are attempting to form the dried DDGS particles into pellets or other agglomerated particles, which do not cake and are easier to handle than the small particles.

Livestock feed users and ethanol producers currently seek a solution to the problem of how to handle dried distiller's grain solubles (DDGS), which are increasing in supply with the increase in ethanol production. To date, the relatively low density and the granular nature of DDGS is a major issue for transportation. Dr. Kurt Rosentrater, a leading DDGS researcher for the United States Department of Agriculture (USDA), has described the production of DDGS pellets as the "Holy Grail" of value-added DDGS production. As it is, it is not uncommon for non-pelletized DDGS to settle into a concrete-like mass during shipping. Several major railroads will not lease cars to ethanol producers for the transportation of non-pelletized DDGS due to the delays and damage that result when the non-pelletized DDGS has to be removed from a rail car. A method of producing pellets of DDGS would reduce settling and increase the bulk density of the final product. Increasing the density would result in lower shipping costs, which is of value to those in the industry.

SUMMARY OF THE INVENTION

It is an object of the present invention to produce Dried Distiller's Grain with Solubles (DDGS) that is formed as a pellet or other agglomerated particle formed through mechanical compression or compounding.

It is an object of the present invention to reduce particulate generation during the processing of grain for ethanol production.

It is another object of the present invention to increase water recovery for reuse in the ethanol production process.

It is another object of the present invention to increase the bulk density of DDGS produced, which will in turn reduce its shipping costs.

It is another object of the present invention to increase de-watering of processed grain by means of mechanical compression.

It is another object of the present invention to increase the evaporation of water below atmospheric pressure.

It is another object of the present invention to increase the capture and elimination of Volatile Organic Compounds (VOCs).

LISTING OF ELEMENTS

| Element Description | Element Number |
| --- | --- |
| Mixer | 22 |
| Pelletizer | 23 |
| Extruder Pellet Mill | 24 |
| Extruder Barrel | 25 |
| Pellet Mill | 26 |
| Pellet | 27 |
| Vacuum Pump | 28 |
| Drain | 29 |
| Microwave Dryer | 30 |
| Conveyor | 31 |
| Gas-Solid Separator | 32 |
| Fan | 33 |
| Roller | 34 |
| Vibrating Feeder | 35 |
| Recycle | 36 |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Operational parameters included herein are for illustrative purposes only, and in no way limit the scope of the present invention.

DEFINITIONS

As used herein, the term "pellets" is meant to include all forms of aggregated, agglomerated, or otherwise mechanically compressed, compounded, or adhered particles. As used herein, the term "pelletize" or "to pellet" is meant to include all forms of aggregating, agglomerating, or otherwise mechanically compressing, compounding, or forming separate smaller particles into larger particles, or forming particles of a desired shape and/or size.

Figure 1:
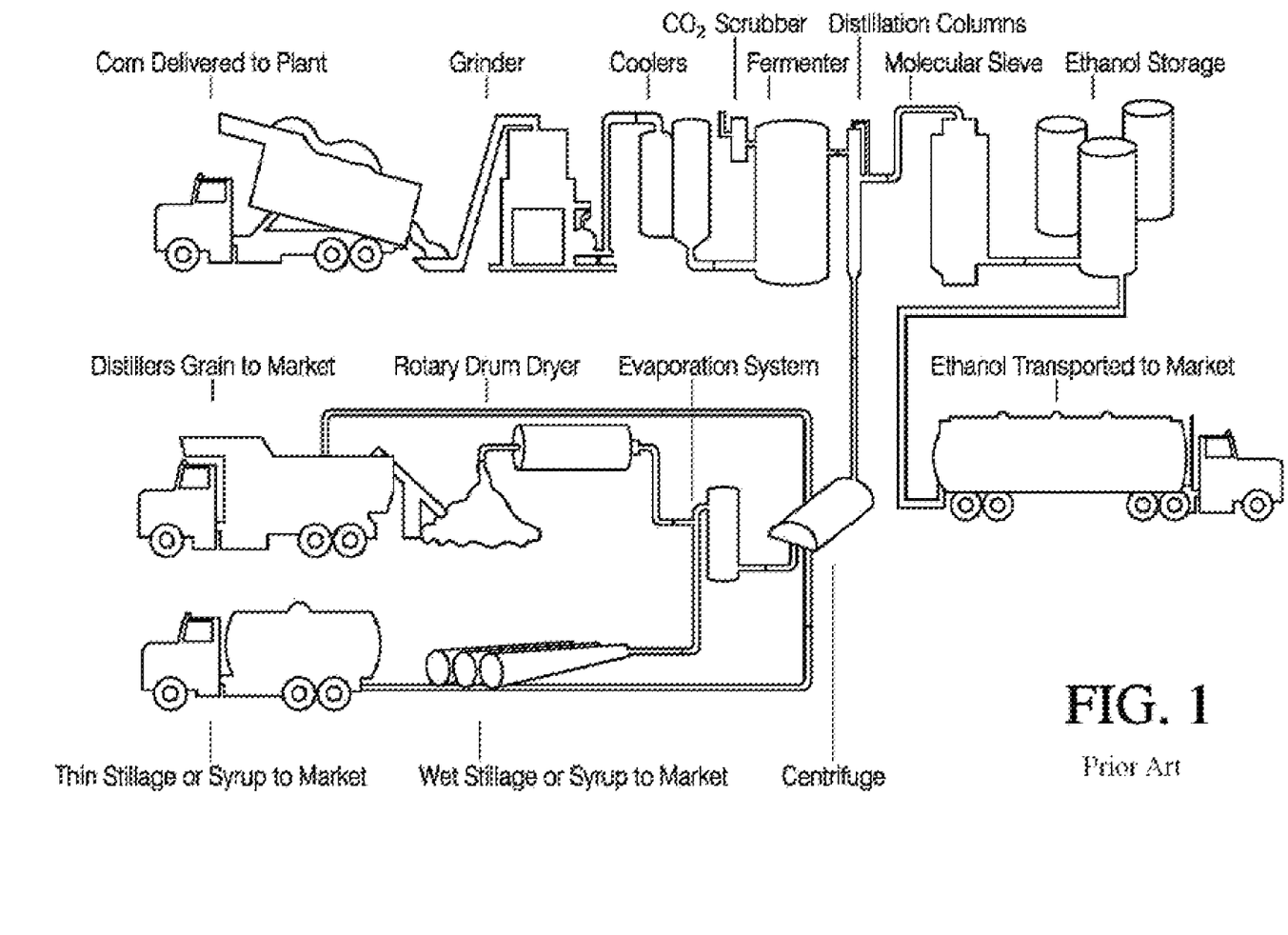
FIG. 1 provides a simplified flow chart of a typical prior art dry corn milling operation.

Referring now to the drawings, wherein like reference numerals designate identical or corresponding parts throughout the several views, FIG. 1 provides a schematic diagram of a typical dry-corn milling process through which ethanol may be produced. In this process, shelled corn first is cleaned of foreign materials. Next, a grinder or hammermill (not shown) grinds the entire grain kernel into flour to produce meal. Water is mixed in with the meal to liquefy (slurrify) the mixture to form a mash. Enzymes are then added to the mash for conversion of the starch in the meal to dextrose, a simple sugar. Ammonia is added to the mash as needed to control the pH of the mixture and for nutritional support of the yeast within the mash. The temperature of the mash is then raised in a high-temperature cooker in a controlled manner to reduce the bacteria levels of the mash prior to fermentation of the mash.

The mash is then cooled and transferred to a fermenter for inclusion of additional yeast to convert the sugar in the mash to ethanol and carbon dioxide. A carbon dioxide scrubber filters a portion of the carbon dioxide off gas. The fermenter is generally capable of agitating and cooling of the mash as needed to control the activity of the yeast. After fermentation, which generally requires 40 to 60 hours, the mash is sent to a distillation column to separate the ethanol product from the stillage, which contains water, protein, fat, and fiber and is often referred to as "whole stillage". A concentrating apparatus then concentrates and dehydrates the ethanol product for storage or transport. Many ethanol refineries have storage tanks on site for storage of the final ethanol product.

Further processing of the whole stillage takes place to separate the coarse grain (which is a product stream that is primarily solid material) from the soluble (which is a product stream that is primarily liquid material). Generally, a centrifuge is used to separate the coarse grain from the solubles, although other apparatuses may be used to separate solubles from the coarse grain. The coarse grain is typically referred to as "distiller's wet grain" (DWG). Water is removed from the solubles by an evaporation apparatus, and the remaining Condensed Distillers Solubles (CDS) or "syrup" may be blended with the DWG at various points, which is described in detail below.

Figure 2:
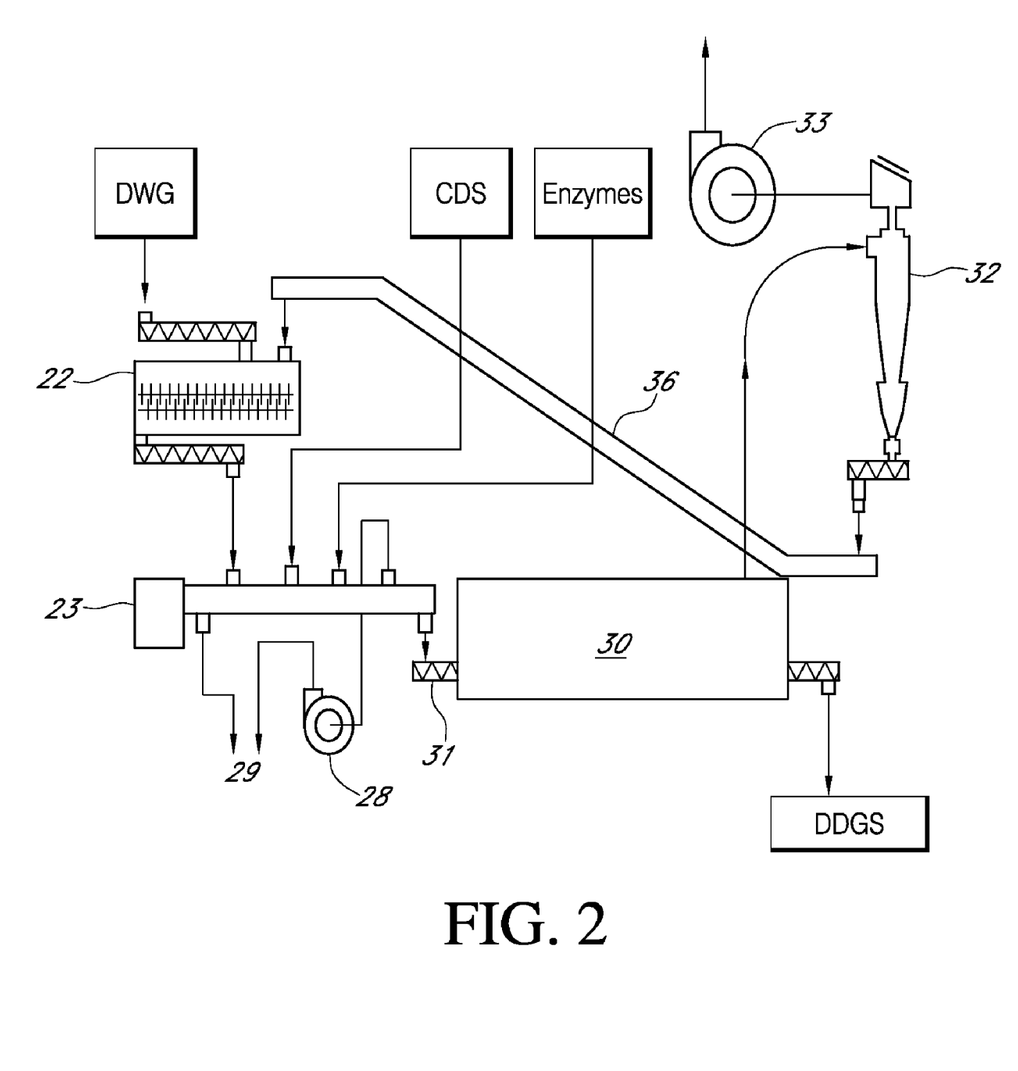
FIG. 2 provides a simplified flow chart of a first embodiment of a method for producing dry DDGS pellets or agglomerated particles.

A first embodiment of the present method is shown in FIG. 2, which is a processing method for DWG. The present art teaches that it is beneficial to compress or extrude the coarse grain product into a pellet 27 before irradiating the pellet with microwave energy for a sufficient time to produce a DDGS pellet 27 that may be transported and or stored for later use as a feed and/or feed additive. Alternatively, the DWG may be compressed or formed into other agglomerated particles while still achieving the benefits of the present method. For example, the DWG may be formed into briquettes, rods, wafers, or any other shape or form without departing from the scope of the present invention. The shape and dimensions of the most beneficial agglomerated particle will depend on several factors, including the desired use for the end product and the characteristics of the feed stream (i.e., the DWG).

Figure 3:
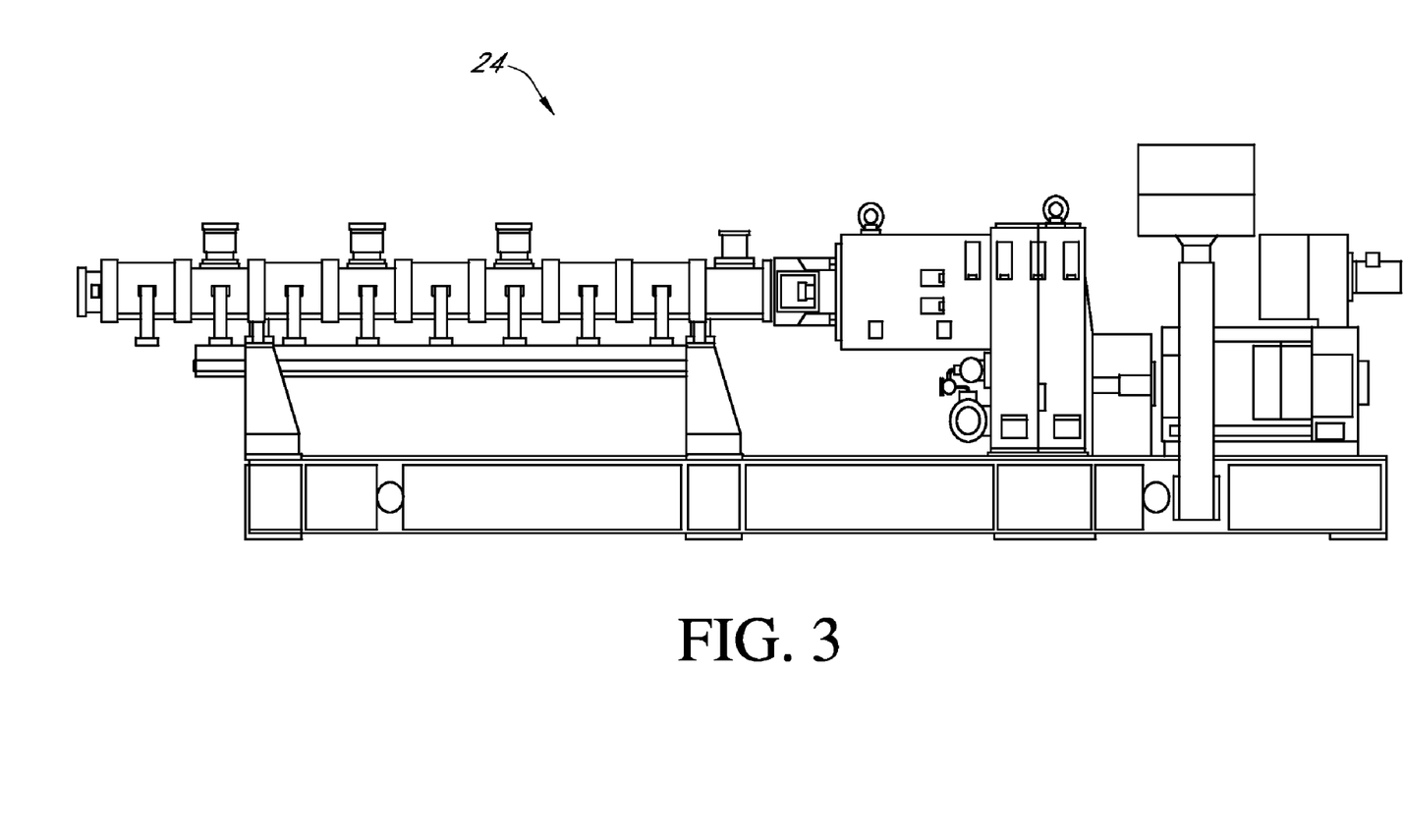
FIG. 3 provides a perspective view of an extruder pellet mill that may be used with the disclosed method.
Figure 4:
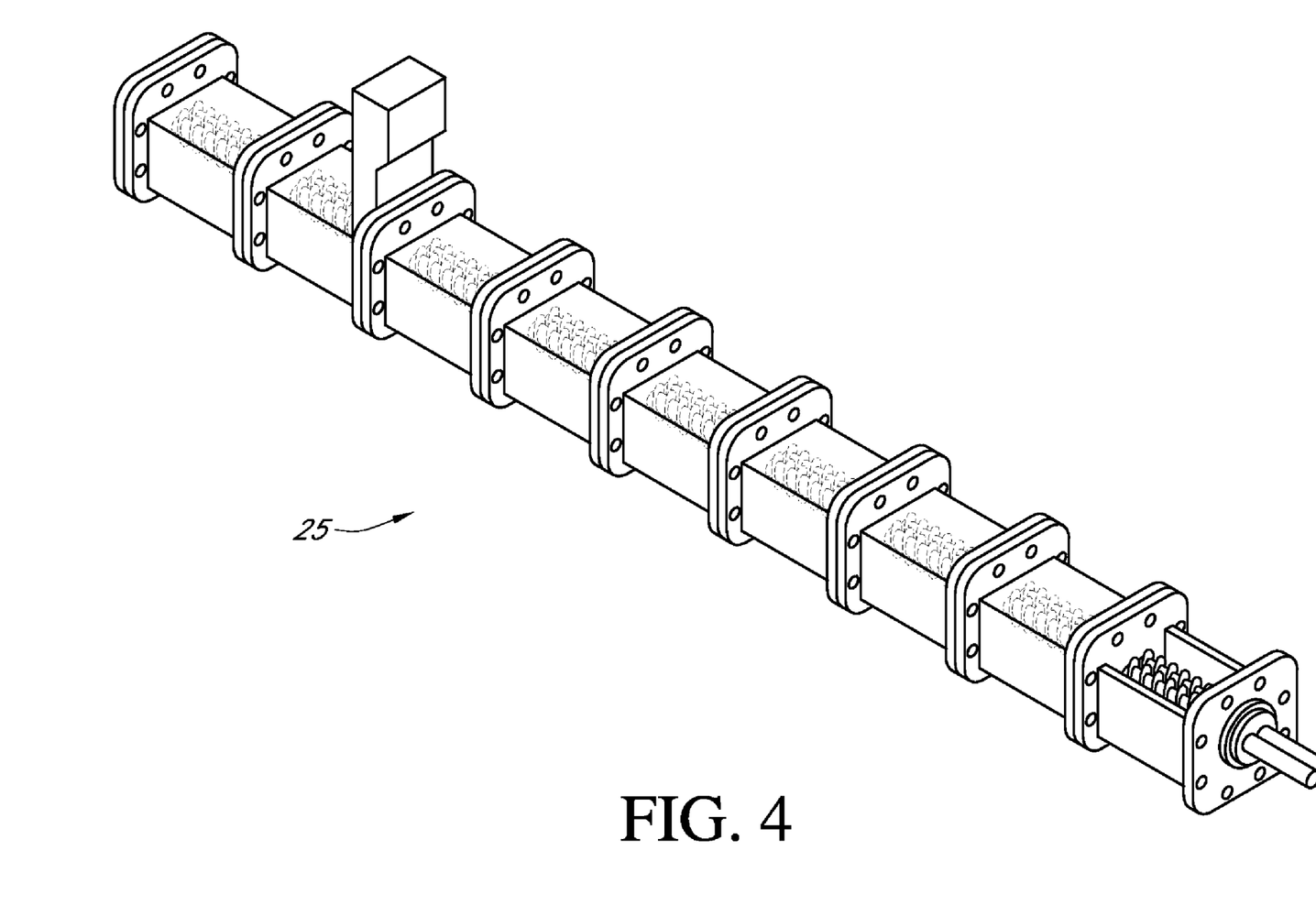
FIG. 4 provides a perspective view of an extruder barrel with the extruder screws installed therein.

DWG from the centrifuge is fed into a mixer 22 into which CDS, enzymes, and/or other additives (not shown) may be blended with the DWG. Additionally, particulate solid material may be added to the DWG in the mixer 22 from a recycle stream, which is described in detail below. Next, the DWG mixture is pelletized to form pellets 27 of DWG and any other additives. As noted above, the present invention is not limited to pellets 27 formed by a pelletizer 23, but includes any other agglomerated particle formed through mechanical compression or compounding. The pelletizer 23 may be any means known to those skilled in the art that is suitable for the particular application. FIG. 3 shows an extruder pellet mill 24 that may be configured for use with the present method. The extruder barrel 25 of such an extruder pellet mill 24 is shown in FIG. 4. Alternatively, a pellet mill 26 such as the one shown in FIG. 5 may be used to form the DWG mixture into pellets 27. Any structure known to those skilled in the art that is capable of being configured to pelletize grain-based materials may be used without departing from the spirit and scope of the present invention.

Figure 5:
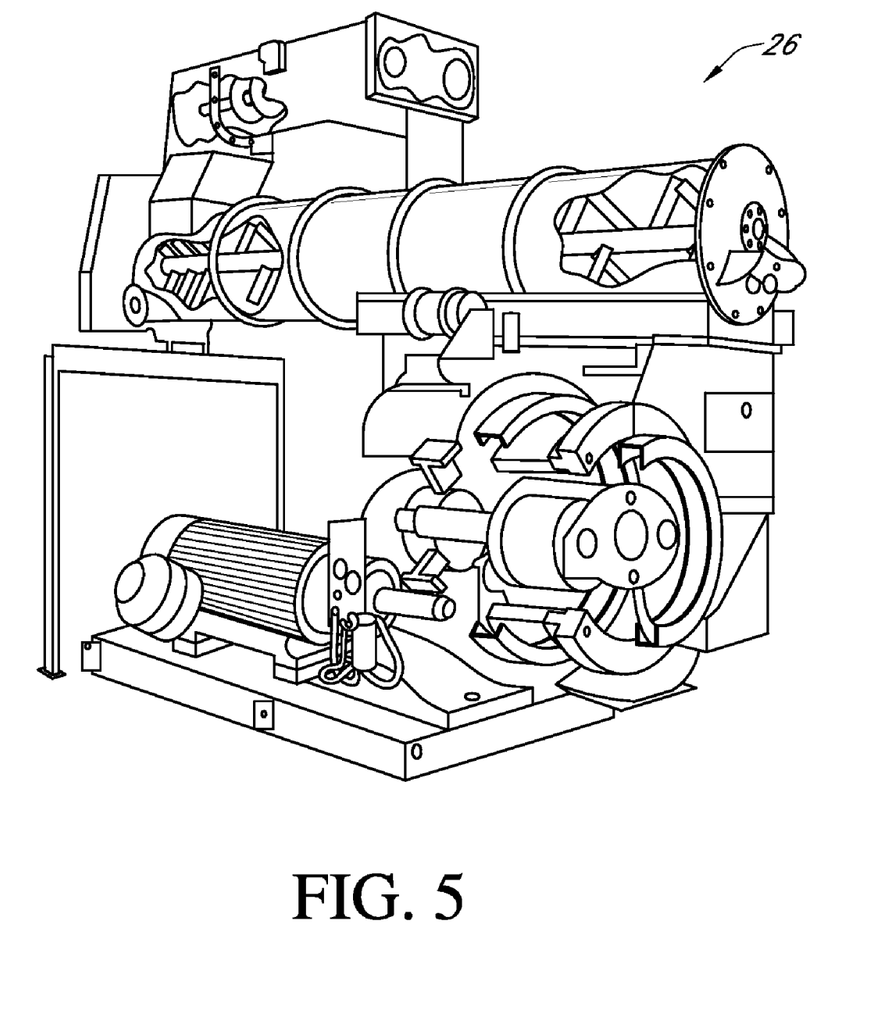
FIG. 5 provides a perspective view of a pellet mill that may be used in certain embodiments of the disclosed method.
Figure 8:
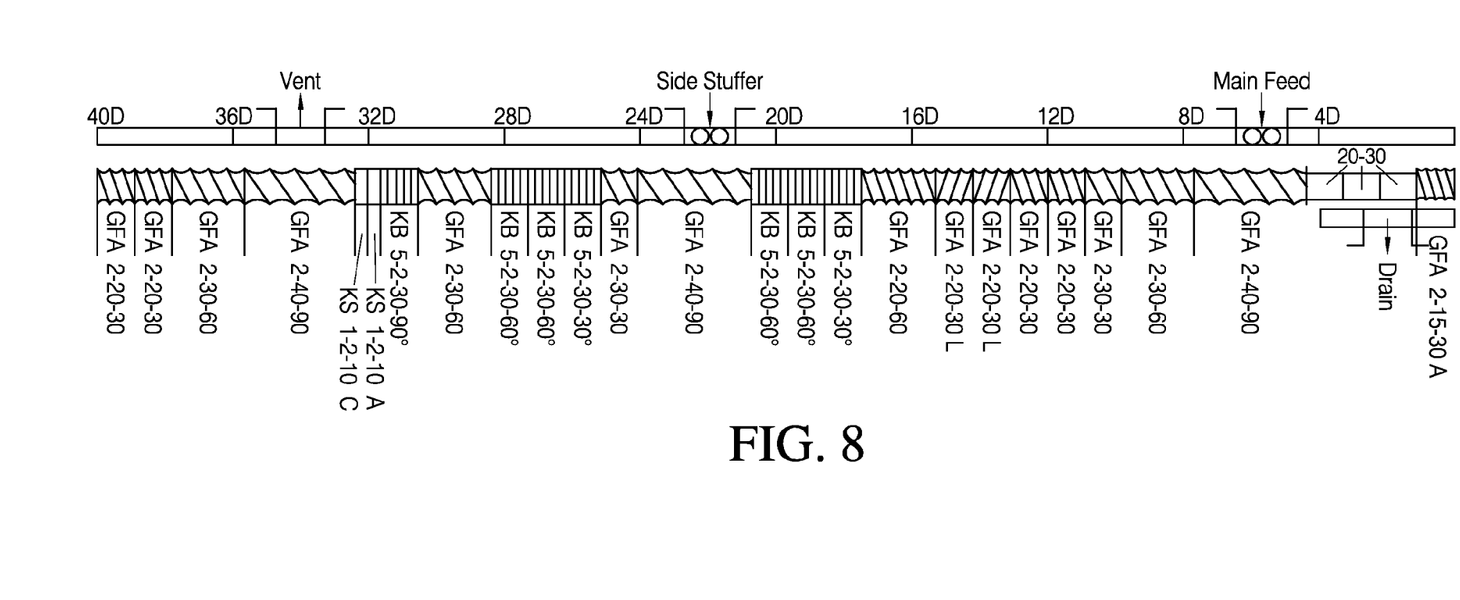
FIG. 8 shows the screw profile of an extruder that may be used in accordance with the present method.

The pelletizer 23 applies pressure to the DWG mixture and is beneficial in aggregating and/or agglomerating the material and increasing the density of the product. Other extruder or compression-type apparatuses may be used to form, agglomerate, or compound the DWG stream into relatively uniformly sized particles without departing from the spirit and intent of this disclosure. For example, a Leistritz dual-screw extruder is shown in FIG. 3, which may be used to agglomerate the DWG according to the present method. A Leistritz extruder barrel 25 is shown in FIG. 4 that may be used in the extruder shown in FIG. 3. A profile of the extruder barrel 25 used in some experiments to pelletize DWG is shown in FIG. 8. Such extruders are well known to those skilled in the art and will not be discussed further herein for purposes of clarity. Additionally, a pellet mill 26 may be used to agglomerate the DWG. A California Mill pellet mill 26 is shown in FIG. 5, and such pellet mills 26 may be used in accordance with the present method. Such pellet mills 26 are well known to those skilled in the art and will not be discussed further herein for purposes of clarity. The pelletizer 23 may remove a portion of the moisture from the DWG, depending on the type of pelletizer 23 that is used and the operating conditions for processing. The pelletizer 23 may be sealed and under vacuum using a typical vacuum pump 28, as shown in FIG. 2, which may be a liquid ring vacuum pump 27. The reduced pressure inside the pelletizer 23 increases the amount of water and VOCs removed from the DWG. The pelletizer 23 may be equipped with a drain 29 to provide an exit for excess water introduced into or removed from the DWG during compression in the pelletizer 23. Additionally, CDS and/or enzymes may be added to the DWG in the pelletizer 23 in a manner similar to that in the mixer 22. The extrusion process may drive off moisture both through compression in the early stages and by evaporation in the final stages. Extruders may also include heating, cooling, and/or vacuum sections to further enhance water and/or VOC removal and control product temperatures. It is contemplated that the pressure in an extruder should be reduced to below 24 inches of mercury, but may be lower or higher depending on the specific embodiment.

Figure 6:
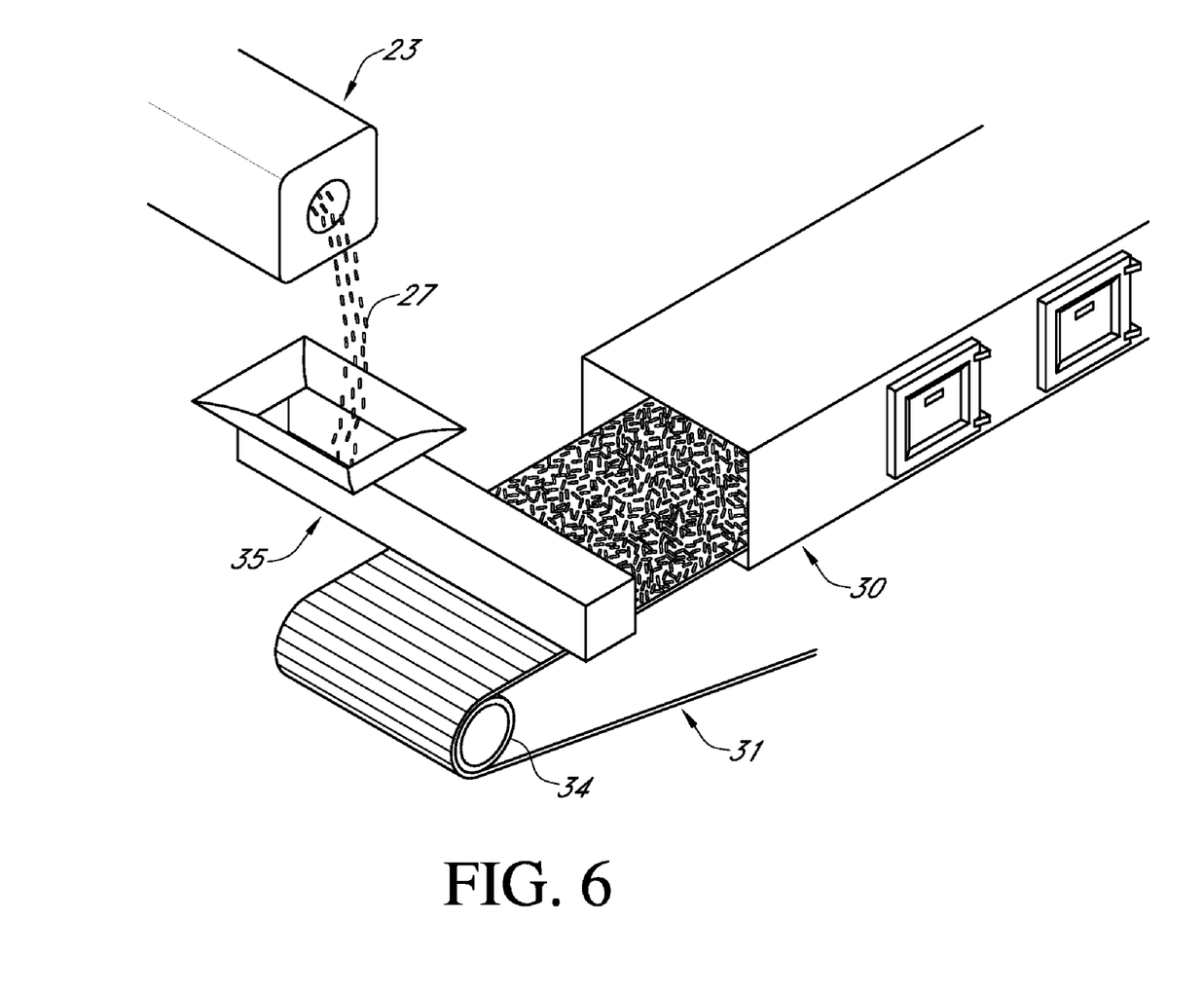
FIG. 6 provides a perspective view of a microwave and conveyor assembly that may be used with the disclosed method.

After the pelletizer 23 has processed the DWG mixture into pellets 27, the pellets 27 are subjected to radiation via a microwave dryer 30. The pellets 27 may be transported through the microwave dryer 30 via a conveyor 31 passing through the microwave dryer 30, as shown in FIG. 6. As shown in FIG. 6, one method for transporting the agglomerated particles (e.g., pellets 27 as pictured herein) from the pelletizer 23 to the microwave dryer 30 is by use of a vibrating feeder 35. The vibrating feeder 35, which may be of any type known to those skilled in the art, deposits the pellets 27 across the conveyor 31 at a uniform density and a uniform thickness for optimal and uniform product characteristics. The desired depth of the product upon the conveyor 31 will vary depending on the penetration depth of the microwave emitter. Other machinery may be used to transport the pellets 27 from the pelletizer 23 to the microwave dryer 30 without departing from the spirit and scope of the present invention. For example, solid pumps (not shown), augers (not shown), or any other equipment known to those skilled in the art for uniformly distributing agglomerated particles may be used with the present method. Furthermore, the type of microwave dryer 30 employed with the present method may partially dictate whether a vibrating feeder 35 or other equipment is used to transport the pellets 27 from the pelletizer 23 to the microwave dryer 30. For example, if the agglomerated particles are transported through the microwave dryer 30 by gravity, then it would be possible to configure the various elements so that the pellets 27 could exit the pelletizer 23 and be deposited directly into the microwave dryer 30. As is well known to those skilled in the art, rollers 34 may be used to facilitate the movement of the conveyor 31. Alternatively, the pellets 27 may be transported through the microwave dryer 30 via gravity or other motive means (not shown). Accordingly, any transportation method known to those skilled in the art may be used without departing from the spirit and scope of the prevent invention.

The microwave dryer 30 may use air flow in the interior of the microwave dryer 30 to further aid in drying the pellets 27. The air flow may be heated and/or dried prior to entering the microwave dryer 30, or the air may be ambient air as it exists near the process site. The purpose of the air flow within the microwave dryer 30 is to absorb moisture rather than to provide the primary energy required to vaporize the moisture (i.e., the latent heat), although air having an elevated temperature may be used in combination with microwave radiation to facilitate drying. Accordingly, the optimal volume of air flow will depend on the specific application and product requirements. However, tests using volumetric flow rates based on the power of the microwave dryer, wherein 26.7 cfm of ambient air were used for each kilowatt of power, produced pellets desirable for some applications. Furthermore, it is within purview of those skilled in the art to design an energy reclamation system for the disclosed method. For example, waste heat from the extruder pellet mill 24 and/or the microwave dryer 30 may be used to preheat the air introduced into the microwave dryer 30. Such energy reclamation systems and equipment are well known to those skilled in the art, and therefore do not limit the scope of the method disclosed herein.

If the microwave dryer 30 is equipped with air flow to aid in drying the pellets 27, a gas-solid separator 32 is beneficial for reclaiming a portion of the solid material that may become entrained in the air flow during drying. As shown in FIG. 2, a fan 33 may be used to provide the motive force for air flow through the microwave dryer 30. The fan 33 draws air through the microwave dryer 30 into the gas-solid separator 32. In the gas-solid separator 32, the air is drawn towards the fan 33 at one end of the gas-solid separator 32 and the solid material exits the gas-solid separator 32 at a different location. The solid material is then removed from the gas-solid separator and may be recycled. FIG. 2 shows the solid material recovered from the gas-solid separator 32 as being recycled to the mixer 22. The solid material recovered from the gas-solid separator 32 may be transported to the mixer 22 or agglomerating machinery by any means known to those skilled in the art, such as a conveyor, auger, etc. Recycling the solid material entrained in the air flow from the microwave dryer 30 reduces dust and/or emissions generated by the process and reduces the moisture content of the feed to the pelletizer 23.

The gas-solid separator 32 and fan 33 shown in FIG. 2 are well known to those skilled in the art and the present process is not limited to the embodiment shown herein.

If the microwave dryer 30 is outfitted with an air flow mechanism, such as a fan 33, the direction of air flow through the microwave dryer 30 will depend on the desired characteristics of the final product and the characteristics of the feed stream to the microwave dryer 30. It is contemplated that co-current or counter-current air flow may be used. Furthermore, it is contemplated that perpendicular air flow may also be used with a microwave dryer 30 that includes a conveyor 31 with a belt that is air permeable. In this configuration, the air would flow from above the conveyor 31 through the product and belt to the bottom portion beneath the conveyor 31, thereby pulling moisture downward through the product. The belt in this configuration may be perforated and constructed of material impermeable to air, in which case the air would flow through the perforations in the belt. As with energy reclamation described above, it is within the purview of those skilled in the art to reclaim water removed from the product for further use. For example, a condenser may be used to remove moisture from the exhaust airflow stream of the microwave dryer 30. Such water reclamation systems and equipment are well known to those skilled in the art, and therefore do not limit the scope of the method as disclosed herein.

In another embodiment of the method disclosed herein, the present art can also be used to further improve the production of plant-based animal foods. As taught by U.S. Pat. No. 6,274,178, which is incorporated by reference herein, the activity of enzymes in industrial processes can be enhanced by treatment with microwave radiation. As previously disclosed, a method of enhancing an enzyme-catalyzed reaction (the method comprising reacting the enzyme with a substrate for the enzyme under the influence of microwave radiation) provides an enzyme reaction that is enhanced. The enzyme may be any enzyme but preferably an industrial enzyme used in industrial or applied processes. In particular, activity of enzymes used in the preparation of food, feed and fodder products can be enhanced by the present invention. Examples of suitable enzymes include, but are not limited to, proteases, phytases, phosphatases, carbohydrate hydrolysing enzymes including gluconases, and xylanases. As indicated above, such enzymes may be added to the DWG at any convenient place in the process, though it is contemplated that if enzymes are added, the enzymes will be added at either the mixer 22 or the pelletizer 23 (or other mechanical compression device used to form agglomerated particles).

The method disclosed herein allows for production of improved animal feed that increases the availability of metabolizable components upon ingestion by the animal. The disclosed method accomplishes this by utilizing and combining mechanical de-watering and compression technologies (illustrated by a centrifuge and pelletizer 23, but not limited to herein) with industrial microwave dryers 30 to process DDGS. The source of substrate may be any plant material, grain or grain products, or components thereof. Examples include, but are not limited to, cereals such as wheat and rice, chaff, hay, silage, brans including rice bran, tuber plants such as potatoes, sugar beets, or the pulps thereof, components thereof, and mixtures thereof.

Figure 7:
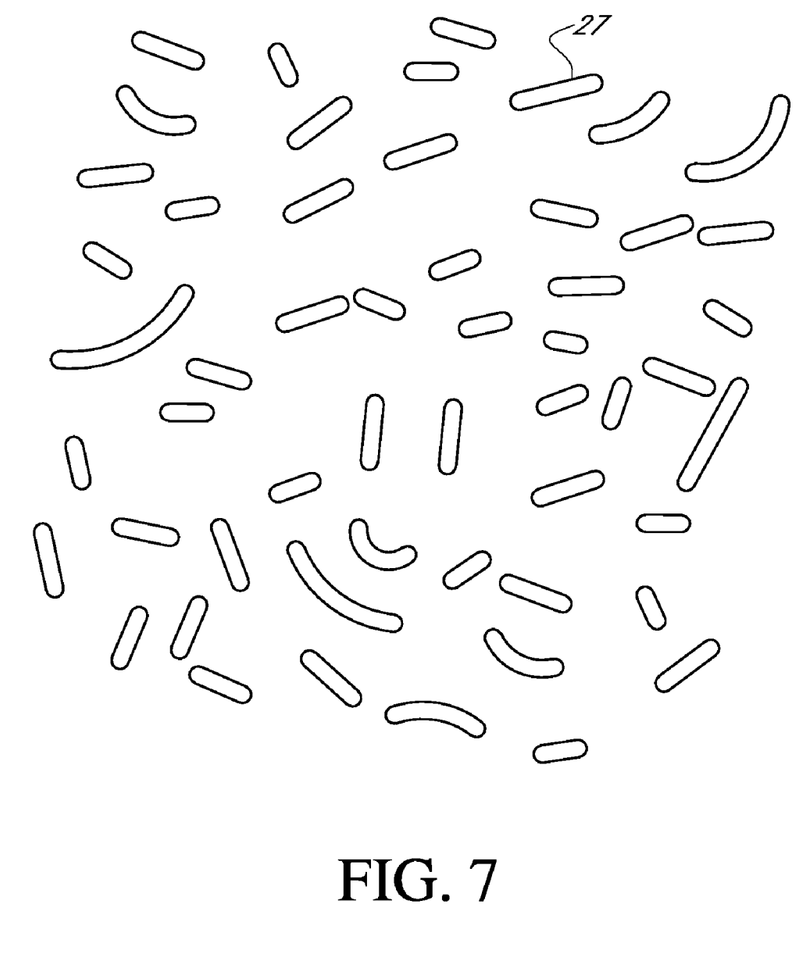
FIG. 7 depicts DDGS pellets made through the disclosed method.

FIG. 7 illustrates a pelletized and microwaved corn-based DDGS pellet 27 product produced by the present art at an ethanol production facility. The final pelletized product has a moisture level that allows transport and storage, and which typically is between 3-40% water by weight. Higher moisture particles may be desired if the pellets 27 will be mixed with dry compounds. In such a process, the pellets 27 may be agglomerated with other dry compounds and subsequently dried so that the final moisture content of the mixed agglomerated particles is much lower than that of the pellets 27 or agglomerated particles formed directly from the DWG.

The present disclosure is applicable to other forms of partially processed cereal grains. For example, it is contemplated that the present method of agglomerating smaller particles and then drying the agglomerated particles in a microwave dryer will be applied to product streams from a wet-corn milling process. Corn germ meal, corn gluten feed, and/or corn gluten meal product streams may be processed according to the present method. Accordingly, additives, such as condensed corn fermented extractives may easily be added to the product streams listed above, either in a mixer 22 or in the agglomerating machinery itself.

Many different types of microwave generators may be used with the microwave dryer 30 in accordance with the present invention. Microwave generators that may work with certain embodiments of the present method are disclosed in U.S. Patent Application Publication No. 2008/0131947, which is incorporated by reference herein. Most microwave transmitters commercially available in the U.S. operate at frequencies of 2450 MHz and 915 MHz, either of which may be used with the present method. The preferred frequency of operation for this disclosed method will often be chosen primarily for increased penetration, power availability, and minimization of the number of transmitters required. It is contemplated that the availability of magnetrons operating at a frequency of 915 MHz and a power level of 75 kW may result in the most cost-effective design for many applications.

The rate of airflow within the microwave dryer 30 is determined by the amount of air required to absorb the moisture removed from the agglomerated particles. The heat provided by the airflow is largely inconsequential, therefore the airflow associated with the present method is less than the airflow used in conventional drying systems, which leads to lower particulate emissions with the present method.

It should be noted that the present invention is not limited to the specific embodiments pictured and described herein, but is intended to apply to all similar processes or methods of processing grains for the production of ethanol, animal food, human consumption, or DDGS. Accordingly, the specific process parameters, values, and/or variables used to explain the dry corn milling process herein are for exemplary purposes only and in no way limit the scope of the present invention. Moreover, the principles disclosed herein may be applied to the solid product streams from a wet corn milling process. Modifications and alterations from the described embodiments will occur to those skilled in the art without departure from the spirit and scope of the present invention. Furthermore, while the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

EXPERIMENTAL RESULTS

Applicant completed a pilot-scale experiment wherein DWG with a 65% moisture content by weight was pelletized using an extruder pellet mill. Four separate experiments were performed with multiple samples.

1. Example 1

DWG was collected from the discharge of a centrifuge at Pine Lake Corn Processors, LLC, located in Steamboat Rock, Iowa. The initial moisture content of the DWG was between 65 and 68 percent by weight. Samples of the DWG were shipped to Iowa State University's Biomass Energy Conversion Center in Nevada, Iowa. The DWG was blended with DDGS from Lincolnway Energy, located in Nevada, Iowa to obtain a moisture content of 50 percent by weight.

The 50 percent moisture by weight sample was introduced into the extruder by a twin-screw feeder with an internal agitator. The material was fed into a twin screw compounding extruder, which in this case was a Leistritz ZSE-27 twin screw compounding extruder with a 15 hp motor. Table 1 provides a list of the operating parameters of the extruder. The screw profile of this extruder is shown in FIG. 8.

TABLE 1

| Barrel Configuration 40:1 Barrel Diameter Ratio | | Screw Element Configuration Screw Diameter is 27 mm Maximum Speed 500 RPM | Function |
|---|---|---|---|
| Section 1 | Inverted vent section to create liquid water drain | GFA 2-15-30 A<br>2D-30<br>2D-30<br>2D-30 | Drain |
| Section 2 | Main feed top inlet | GFA 2-40-90 | Feed section |
| Section 3 | Solid section (no openings) | GFA 2-30-60<br>GFA 2-30-30<br>GFA 2-20-30 | Material transport |
| Section 4 | Solid section (no openings) | GFA 2-20-30<br>GFA 2-20-30L<br>GFA 2-20-30L | Liquid seal |
| Section 5 | Solid section (no openings) | GFA 2-20-60<br>KB 5-2-30-60<br>KB 5-2-30-60 | Gas seal |
| Section 6 | Top vent outlet | KB 5-2-30-60<br>GFA 2-40-90 | Vacuum connection |
| Section 7 | Solid section (no openings) | GFA 2-30-30<br>KB 5-2-30-60<br>KB 5-2-30-60<br>KB 5-2-30-60 | Material transport |
| Section 8 | Solid section (no openings) | GFA 2-30-60<br>KB 5-2-30-90<br>KS 1-2-10 A | Gas seal |
| Section 9 | Top vent outlet | KS 1-2-10 E<br>GFA 2-40-90 | Vacuum connection |
| Section 10 | Solid section (no openings) | GFA 2-30-60<br>GFA 2-20-30<br>GFA 2-20-30 | Material transport build pressure up stream of die |

The production rate for sample 1 was 25 pounds per hour, and the extruder had ten controlled heat/cooling zones on the barrel, as indicated in Table 1. The die was heated to 50 degrees Celsius and had an opening of 5/32 of one inch. The screws turned at a rate of 150 rpm. The resulting pellets were between 35 and 40 percent moisture by weight. Once the pellets reach equilibrium with the surrounding environment, the active evaporation of water from the pellets ceases.

An electrically driven vibratory feeder was used to produce a uniform layer of pellets across a perforated conveyor belt. A microwave transmitter operating at a frequency of 915 MHz and a power of 75 kW was used (AMT 7510/7520 supplied by Applied Microwave Technology, Inc. located in Cedar Rapids, Iowa). The resulting penetration depth was 2.5 inches. In this experiment, a 2000 cfm exhaust fan was used, which yields an airflow to microwave power ratio of 26.67 cfm/kW. However, this ratio may be higher or lower for different applications.

As the pellets traveled through the microwave oven, the power of the microwave radiation is reduced. For this sample, when the pellets reached approximately 20% moisture by weight, the microwave power was reduced by approximately 50%. The pellets were dried for one minute on each pass for three passes through the microwave oven (3 minutes total drying time). The resulting moisture of the pellets was between 10 and 15 percent by weight.

2. Example 2

As before, DWG was collected from the discharge of a centrifuge at Pine Lake Corn Processors, LLC, located in Steamboat Rock, Iowa. The initial moisture content of the DWG was between 65 and 68 percent by weight. Samples of the DWG were shipped to American Leistritz Extruder Corporation in Somerville, N.J.

As before, the DWG was introduced into the extruder by a twin screw feeder with an internal agitator. As with sample 1, the extruder was a twin screw compounding extruder, Leistritz MICRO 27/GL 40D with a 15 hp motor. The peak extruder temperature was 60 degrees Celsius and the die opening was again set to 5/32 of an inch. The extruder produced pellets with a moisture content between 35 and 40 percent by weight. The pellets were placed on filter paper and allowed to cool to ambient temperature.

A Sharp microwave oven (model R-308NR, 1 cubic foot interior, 1,500 W of consumption power and 1,100 W of maximum microwave power) was used for the drying process. Fifty grams of pellets were placed in the microwave oven, dried for 1 minute at full power, and then removed from the microwave and weighed. The product was then again dried for 1 minute at full power, removed from the microwave, and weighed. The resulting moisture of the pellets dried 2 minutes was 12.99% moisture by weight.

3. Example 3

For a control group and baseline for pellet moisture, pellets made as described in Example 2 were allowed to air dry in ambient conditions. After 30 days of storage in which the ambient air temperature was approximately 77 degrees Fahrenheit, the resulting moisture of the pellets was 22.75% by weight.

4. Example 4

DWG was collected as described in Examples 2 and 3. The DWG was not pelletized and placed on filter paper. As in Example 2, a Sharp microwave oven (model R-308NW, 1 cubic foot interior, 1,500 W of consumption power and 1,100 W of maximum microwave power) was used for the drying process.

One hundred grams of DWG was placed in the microwave oven and dried for 2 minutes at full power. The bulk product was then removed from the microwave oven and weighed. The product was again dried for 2 minutes at full power for a total drying time of 4 minutes. The resulting moisture of the bulk product in two separate samples was 29.2% and 27.6% moisture by weight. Attempts to dry the bulk samples to 10 percent moisture by weight resulted in portions of the sample being charred.

5. Experimental Results

The dried material according to the several examples was tested by Analab located in Fulton, Ill. The results of the testing are summarized in Table 2. Sample 1 was prepared according to the method described in example 1. Samples 2 and 4 were prepared according to the method described in example 2. Sample 3 was prepared according to the method described in example 3. Samples 5 and 6 were prepared according to the method described in example 4. All values shown in Table 2 (except moisture and parts per million (PPM)) are on a 100% dry matter weight-basis. The quantity of neutral detergent insoluble crude protein is represented by the NDIP in Table 2.

TABLE 2

| Property | Sample | | | | | |
|---|---|---|---|---|---|---|
|  | 1 | 2 | 3 | 4 | 5 | 6 |
| Moisture Content % | 13.68 | 12.99 | 22.72 | 15.92 | 27.63 | 29.23 |
| Dry Matter (% db) | 86.32 | 87.01 | 77.29 | 84.08 | 72.37 | 70.78 |
| Crude Protein (% db) | 29.34 | 29.37 | 29.81 | 30.88 | 30.31 | 30.38 |
| Soluble Protein | 9.82 | 8.47 | 10.19 | 15.23 | 14.27 | 12.26 |
| Fiber - ADF (% db) | 19.14 | 21.60 | 19.63 | 19.00 | 18.91 | 18.59 |
| Fiber - NDF (% db) | 32.08 | 34.66 | 35.68 | 36.25 | 38.25 | 35.04 |
| ADIN (ND) | 2.40 | 4.41 | 4.82 | 4.85 | 5.56 | 5.47 |
| Starch (% db) | 4.41 | 5.44 | 5.02 | 5.57 | 5.29 | 5.19 |
| Fat (% db) | 12.95 | 11.96 | 12.02 | 12.06 | 11.45 | 11.71 |
| Calcium | 0.08 | 0.04 | 0.04 | 0.04 | 0.04 | 0.04 |
| Phosphorus | 0.89 | 0.82 | 0.78 | 0.79 | 0.83 | 0.80 |
| Magnesium | 0.32 | 0.27 | 0.26 | 0.26 | 0.28 | 0.28 |
| Potassium | 1.10 | 0.97 | 0.91 | 0.91 | 0.97 | 0.94 |
| Sulfur | 0.80 | 0.83 | 0.81 | 0.80 | 0.84 | 0.92 |

TABLE 2-continued

| Property | Sample | | | | | |
|---|---|---|---|---|---|---|
|  | 1 | 2 | 3 | 4 | 5 | 6 |
| Sodium | 0.16 | 0.36 | 0.34 | 0.34 | 0.35 | 0.34 |
| Ash (% db) | 4.17 | 4.68 | 4.06 | 4.18 | 3.72 | 3.48 |
| NDIP | 8.55 | 9.68 | 10.62 | 10.26 | 9.90 | 9.82 |
| Copper (PPM) | 7 | 7 | 6 | 6 | 5 | 5 |
| Iron (PPM) | 215 | 464 | 431 | 449 | 103 | 98 |
| Manganese (PPM) | 19 | 16 | 14 | 17 | 14 | 13 |
| Zinc (PPM) | 33 | 25 | 14 | 20 | 26 | 23 |

The results indicate that the agglomeration and microwave drying method of processing DDGS enhances the ability to transport DDGS while simultaneously avoiding the need for binding agents. Furthermore, the results indicate that microwave drying bulk DWG without agglomeration (Samples 5 and 6 in Table 2) degrades the nutritional value of the product when compared to samples that were first pelletized. This degradation is indicated by acid detergent insoluble nitrogen (ADIN), which primarily represents heat-damaged or bound protein that is indigestible or poorly digested by animals. Moreover, the pelletized product (Samples 1, 2, and 4 in Table 2) could be dried to a lower moisture content.

6. Pellet Durability

To determine the durability of the pellets produced in samples 1, 2, and 4, a two-compartment pellet durability tester supplied by Continental Agra Equipment, Inc., located in Newton, Kans. was used. Another suitable durability tester is available from Seedburo Equipment Co., located in Chicago, Ill.

The pellet durability tester utilized a standard test developed by Kansas State University to predict the amount of fine particulates produced by a typical amount of handling of the pellets prior to consumption (e.g., transportation and distribution to animals). The test is carried out using a specially designed pellet tumbler that is designed to replicate the amount of breakage that normally occurs from the time the pellets are expelled from the pelletizer until they are consumed by the animal. The results of the test are interpreted as a standard measure of quality, which is referred to as the Pellet Durability Index (PDI).

The procedure for the test will now be set forth. First, the tester secures a representative sample of the pellets. The tester then removes broken pellets from the sample with an appropriate hand sieve. Next, 500 grams of the screened sample are weighed out and tumbled in the durability tester for 10 minutes. The pellets are then rescreened and the mass of whole pellets remaining from the initial 500 grams is determined. The PDI is determined by dividing the mass of the whole pellets remaining by 500 grams and multiplying that value by 100. Accordingly, the durability of the pellets is expressed as a percentage.

The results of the durability testing are shown in Table 3. As with the experiment results for the pellets shown in Table 2, sample 1 was prepared according to the method described in example 1, samples 2 and 4 where prepared according to the method described in example 2, and sample 3 was prepared according to the method described in example 3. Samples 5 and 6 were not agglomerated into pellets and were therefore not tested for durability.

TABLE 3

| Sample | Rep | Diameter (mm) | Length (mm) | Weight (g) | Unit Density (g/cm3) | Water Activity (—) | Compressive Strength (MPa) | Stiffness (MPa) | Durability (%) |
|---|---|---|---|---|---|---|---|---|---|
| Sample 1 | 1 | 2.78 | 26.19 | 0.1486 | 0.934 | 0.521 | 0.914 | 5.447 | 97.296 |
|  | 2 | 2.73 | 25.98 | 0.1437 | 0.945 | 0.522 | 1.152 | 6.279 | 97.863 |
| Sample 2 | 1 | 3.66 | 26.25 | 0.2495 | 0.903 | 0.515 | 1.147 | 9.408 | 98.375 |
|  | 2 | 3.42 | 26.09 | 0.2089 | 0.872 | 0.516 | 1.033 | 8.474 | 98.568 |
| Sample 3 | 1 | 3.6 | 26.74 | 0.2714 | 0.997 | 0.772 | 0.313 | 1.632 | NA |
|  | 2 | 3.52 | 25.39 | 0.2329 | 0.943 | 0.773 | 0.3 | 1.657 | NA |
| Sample 4 | 1 | 3.52 | 25.63 | 0.207 | 0.830 | 0.607 | 0.916 | 4.952 | 98.251 |
|  | 2 | 3.51 | 27.24 | 0.2424 | 0.920 | 0.607 | 0.723 | 4.914 | 98.277 |

As with the experimental results, sample 3 was included as a control (i.e., sample 3 was agglomerated into pellets but not dried in a microwave oven). The results show that the pellets dried in a microwave oven (samples 1, 2, and 4) have a higher DPI than those not dried in a microwave oven. This is a result of the tempering that occurs during the microwave drying. The high durability of the pellets is critical for shipping. The pellets dried in a microwave oven also display a relatively low overall strength, which aides further processing and digestion. From these results, it appears that microwave drying concentrates the naturally occurring binding agents at the pellets surface, which results in a relatively soft core.

Animal feed produced with the characteristics shown for samples 1, 2, and 4 has improved flowability, which eases handling, storage, and transporting the product. Because the pellets are relatively hard and durable, there is less dust formation, fines formation, and less loss attributed with handling and transportation. Pellets having a diameter between 2 and 4 millimeters is desirable because it mitigates or eliminates the need to further process the DDGS prior to using the pellets.

The invention claimed is:

1. A method of producing dried distiller's grain agglomerated particles comprising:
    a. agglomerating, through use of an extruder, a substance consisting solely of distiller's wet grain after said distiller's wet grain and liquids including solubles contained in a whole stillage substance are separated from one another; and,
    b. irradiating said agglomerated particles formed in the previous step with microwave emitters producing sufficient energy until the moisture content of said agglomerated particles is between 3% and 40% water by weight,
    c. wherein said agglomerated particles are further defined as pellets.

2. A method of producing dried distiller's grain agglomerated particles comprising:
    a. agglomerating, through use of an extruder, a substance consisting solely of, distiller's wet grain after said distiller's wet grain and liquids including solubles contained in a whole stillage substance are separated from one another, said distiller's wet grain having a moisture content greater than fifty (50) percent water by weight; and
    b. irradiating said agglomerated particles formed in the previous step with at least one microwave emitter producing sufficient energy until the moisture content of said agglomerated particles is between three (3) and forty (40) percent water by weight,
    c. wherein said agglomerated particles are further defined as pellets.

* * * * *